(12) United States Patent
Nakano

(10) Patent No.: US 9,432,548 B1
(45) Date of Patent: Aug. 30, 2016

(54) OPTICAL SCANNING DEVICE AND IMAGE FORMING APPARATUS USING THE SAME

(71) Applicant: KYOCERA Document Solutions Inc., Osaka-shi, Osaka (JP)

(72) Inventor: Issei Nakano, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 15/019,883

(22) Filed: Feb. 9, 2016

(30) Foreign Application Priority Data

Feb. 12, 2015 (JP) ................................. 2015-025648

(51) Int. Cl.

| | |
|---|---|
| G03G 15/00 | (2006.01) |
| H04N 1/06 | (2006.01) |
| G06K 15/12 | (2006.01) |
| H04N 1/113 | (2006.01) |
| G02B 26/12 | (2006.01) |
| G03G 15/043 | (2006.01) |

(52) U.S. Cl.
CPC .............. *H04N 1/06* (2013.01); *G02B 26/123* (2013.01); *G02B 26/125* (2013.01); *G03G 15/043* (2013.01); *G06K 15/1228* (2013.01); *H04N 1/113* (2013.01)

(58) Field of Classification Search
USPC ............... 399/1, 2, 4, 31, 32, 177, 220, 221; 347/231, 243; 359/196.1, 201.1, 204.1, 359/216.1
See application file for complete search history.

(56) References Cited

U.S. PATENT DOCUMENTS

| 7,411,712 | B2 * | 8/2008 | Nakajima | ............ G02B 26/123 359/204.1 |
| 7,626,744 | B2 * | 12/2009 | Arai | ....................... B82Y 20/00 359/204.1 |
| 9,158,112 | B2 * | 10/2015 | Ishihara | ................... B41J 2/471 |
| 9,221,272 | B2 * | 12/2015 | Hirakawa | ................ B41J 2/473 |

FOREIGN PATENT DOCUMENTS

JP            11084285 A     3/1999

* cited by examiner

*Primary Examiner* — Hoan Tran
(74) *Attorney, Agent, or Firm* — Alleman Hall McCoy Russell & Tuttle LLP

(57) ABSTRACT

An optical scanning device includes a light source unit, a deflector, and a scanning lens. The deflector reflects first and second light beams emitted from the light source such that the beams scan a scanned surface in main scanning direction. The scanning lens is disposed between the deflector and the scanned surface, includes incident and emission surfaces, and focuses the first and second light beams on the scanned surface. At least one of incident and emission surfaces is an optical refractive surface in which first and second refractive surfaces through which the first and second light beams pass respectively are arranged in alignment in the sub scanning direction. An interval between a first generatrix of the first refractive surface and a second generatrix of the second refractive surface in the sub scanning direction increases from a center portion toward end portions of the scanning lens in the main scanning direction.

7 Claims, 14 Drawing Sheets

OPTICAL SCANNING DEVICE AND IMAGE FORMING APPARATUS USING THE SAME

INCORPORATION BY REFERENCE

This application is based upon and claims the benefit of priority from the corresponding Japanese Patent Application No. 2015-025648 filed on Feb. 12, 2015, the entire contents of which are incorporated herein by reference.

BACKGROUND

The present disclosure relates to an optical scanning device including a light source for emitting a plurality of laser beams, and a deflector for deflecting the laser beams such that the laser beams scan the scanned surfaces, and relates to an image forming apparatus using the optical scanning device.

An optical scanning device for use in a color laser printer or the like includes: a plurality of laser light sources; a deflector for deflecting the laser beams emitted from the light sources such that the laser beams scan the circumferential surfaces of the photoconductor drums; and a scanning lens for focusing the deflected laser beams on the circumferential surfaces. There is known an optical scanning device in which a plurality of laser light sources are disposed in alignment in the sub scanning direction, and a plurality of light beams are incident on a single scanning lens. In this case, a plurality of independent optical surfaces are formed on the scanning lens for the focusing of the light beams.

SUMMARY

An optical scanning device according to an aspect of the present disclosure includes a light source unit, a deflector, and a scanning lens. The light source unit includes a light source for emitting a first light beam and a second light beam that are to be irradiated on a scanned surface, and an incidence optical system for the first light beam and the second light beam. The light source unit emits the first light beam and the second light beam with angles respectively with respect to a reference line perpendicular to a sub scanning direction such that the first light beam and the second light beam are aligned in the sub scanning direction and an interval between the first light beam and the second light beam in the sub scanning direction expands toward the scanned surface. The deflector reflects the first light beam and the second light beam emitted from the light source unit such that the first light beam and the second light beam scan the scanned surface in a main scanning direction. The scanning lens is disposed between the deflector and the scanned surface, includes an incident surface and an emission surface, and focuses the first light beam and the second light beam on the scanned surface. At least one of the incident surface and the emission surface is an optical refractive surface in which a first refractive surface and a second refractive surface are arranged in alighnment in the sub scanning direction, wherein the first light beam passes through the first refractive surface and the second light beam passes through the second refractive surface. An interval between a first generatrix of the first refractive surface and a second generatrix of the second refractive surface in the sub scanning direction increases from a center portion toward end portions of the scanning lens in the main scanning direction.

An image forming apparatus according to another aspect of the present disclosure includes an image carrying member configured to carry an electrostatic latent image, and the above-described optical scanning device configured to emit a light beam, the scanned surface being a circumferential surface of the image carrying member.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
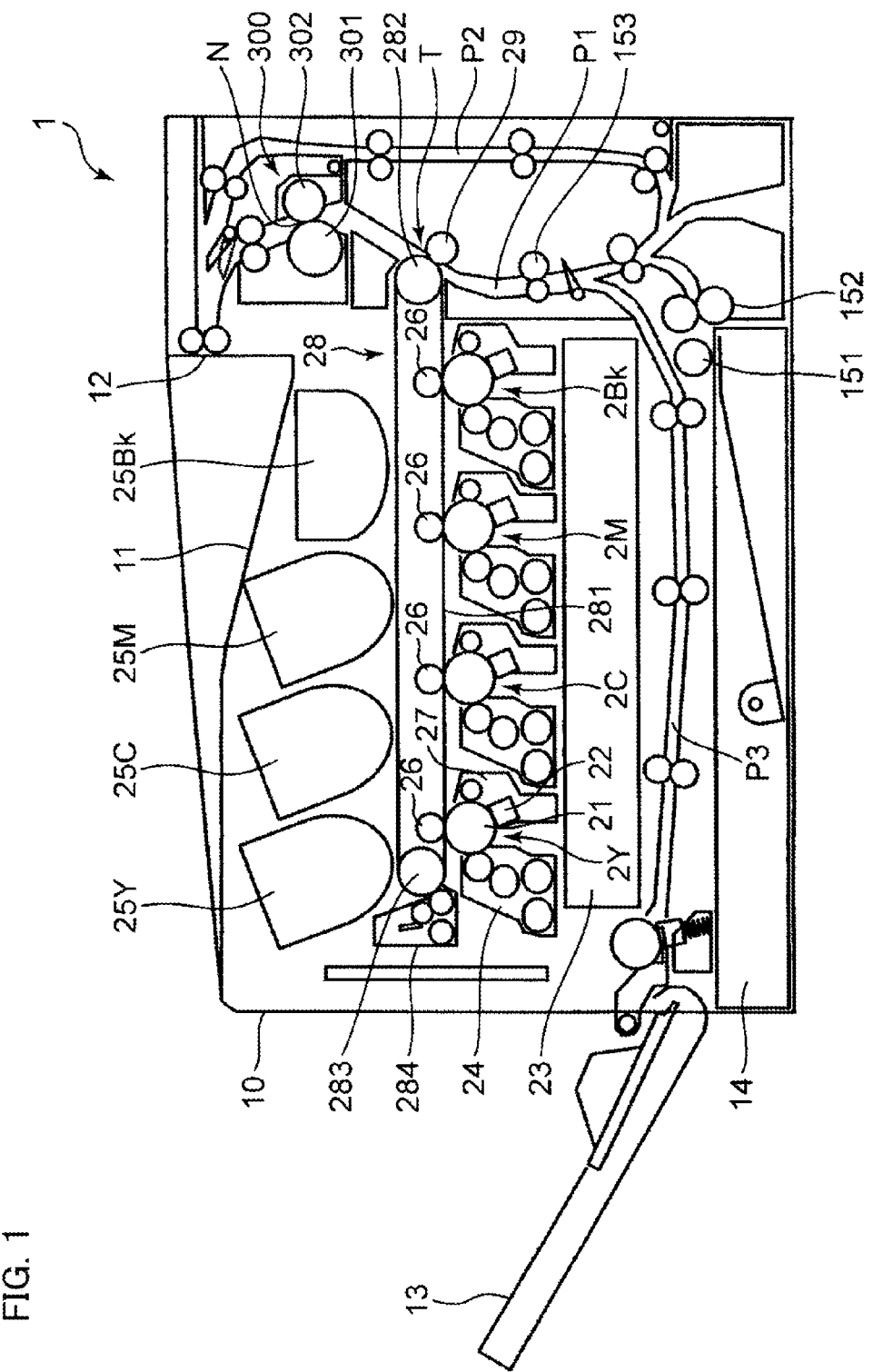
FIG. 1 is a cross-sectional view showing a schematic configuration of an image forming apparatus according to an embodiment of the present disclosure.

The following describes an embodiment of the present disclusure with reference to the drawings. FIG. 1 is a schematic cross-sectional view showing the internal configuration of an image forming apparatus 1 according to an embodiment of the present disclosure. The image forming apparatus 1 is a color printer, and includes a main body housing 10 that is formed approximately in the shape of a rectangular parallelepiped.

The main body housing 10 includes therein a plurality of processing units for performing an image formation process to a sheet. In the present embodiment, the main body housing 10 includes, as the processing units, image forming units 2Y, 2C, 2M and 2Bk, an optical scanning device 23, an intermediate transfer unit 28, and a fixing device 300. A sheet discharge tray 11 is provided on the upper surface of the main body housing 10. A sheet discharge port 12 is opened opposite to the sheet discharge tray 11. A manual feed tray 13 is attached to a side wall of the main body housing 10 in a freely openable/closable manner. A sheet feed cassette 14 is attached to a lower part of the main body housing 10 in a freely attachable/detachable manner, wherein sheets on which images are to be formed by the image formation process are stored in the sheet feed cassette 14.

The image forming units 2Y, 2C, 2M and 2Bk are configured to form toner images of yellow, cyan, magenta and black respectively based on image information transmitted from an external apparatus such as a computer, and are aligned at predetermined intervals in tandem in the horizontal direction. Each of the image forming units 2Y, 2C, 2M and 2Bk includes: a cylindrical photoconductor drum 21 (the image carrying member) for carrying an electrostatic latent image and a toner image; a charger 22 for charging the circumferential surface of the photoconductor drum 21; a developing device 24 for forming a toner image by causing the developer to be adhered to the electrostatic latent image; a corresponding one of toner containers 25Y, 25C, 25M and 25Bk which respectively supply yellow, cyan, magenta and black toners to the developing devices 24; a primary transfer roller 26 for performing a primary transfer of transferring a toner image formed on the photoconductor drum 21; and a cleaning device 27 for removing residual toner from the circumferential surface of the photoconductor drum 21.

The optical scanning device 23 forms electrostatic latent images on the circumferential surfaces of the photoconductor drums 21 of respective colors. The optical scanning device 23 of the present embodiment includes a plurality of light sources and focusing optical systems in one housing, wherein the plurality of light sources are prepared for the respective colors, and the focusing optical systems focus and scan the light beams emitted from the light sources on the circumferential surfaces 21S (scanned surfaces) of the photoconductor drums 21 of the respective colors. The focusing optical systems are not independent optical systems, but a part thereof is used in common. The optical scanning device 23 is described below.

The intermediate transfer unit 28 performs a primary transfer of transferring toner images formed on the photoconductor drums 21. The intermediate transfer unit 28 includes a transfer belt 281, a driving roller 282 and a driven roller 283, wherein the transfer belt 281 circumferentially rotates while contacting the circumferential surfaces of the photoconductor drums 21, and the transfer belt 281 is suspended between the driving roller 282 and the driven roller 283. The transfer belt 281 is pressed against the circumferential surfaces of the photoconductor drums 21 by the primary transfer rollers 26. In the primary transfer, the toner images of respective colors are transferred from the photoconductor drums 21 so as to be overlaid at a same position on the transfer belt 281. This allows a full-color toner image to be formed on the transfer belt 281.

A secondary transfer roller 29 is disposed opposite to the driving roller 282 across the transfer belt 281 so as to form a secondary transfer nip portion T. In the secondary transfer, the full-color toner image is transferred from the transfer belt 281 to a sheet by the secondary transfer nip portion T. Toner that has remained on the circumferential surface of the transfer belt 281 without being transferred to the sheet, is collected by a belt cleaning device 284 disposed opposite to the driven roller 283.

The fixing device 300 includes a fixing roller 301 and a pressure roller 302, wherein a heat source is embedded in the fixing roller 301, and the fixing roller 301 and the pressure roller 302 form a fixing nip portion N. The fixing device 300 performs a fixing process in which the sheet to which the toner image has been transferred by the secondary transfer nip portion T is heated and pressed by the fixing nip portion N so that the toner is fused and fixed to the sheet. The sheet subjected to the fixing process is discharged from the sheet discharge port 12 toward the sheet discharge tray 11.

A sheet conveyance path for conveying sheets is provided in the main body housing 10. The sheet conveyance path includes a main conveyance path P1 that vertically extends from near a lower part of the main body housing 10 to near an upper part via the secondary transfer nip portion T and the fixing device 300. The downstream end of the main conveyance path P1 is connected to the sheet discharge port 12. A reverse conveyance path P2 for conveying a reversed sheet in the double-side printing is provided to extend from the most downstream end in the main conveyance path P1 to near the upstream end. In addition, a manually fed sheet conveyance path P3 extending from the manual feed tray 13 to the main conveyance path P1 is disposed above the sheet feed cassette 14.

The sheet feed cassette 14 includes a sheet storage portion for storing a stack of sheets. A pick-up roller 151 and a pair of sheet feed rollers 152 are disposed in the vicinity of an upper-right part of the sheet feed cassette 14, wherein the pick-up roller 151 picks up, one by one, the top sheets of the stack of sheets, and the pair of sheet feed rollers 152 feed the picked-up sheet toward the upstream end of the main conveyance path P1. A sheet placed on the manual feed tray 13 is also conveyed to the upstream end of the main conveyance path P1 via the manually fed sheet conveyance path P3. A pair of registration rollers 15 are disposed more on the upstream side than the secondary transfer nip portion T in the main conveyance path P1, wherein the pair of registration rollers 15 feed a sheet to the transfer nip portion at a predetermined timing.

When a single-side printing (image formation) process is performed to a sheet, the sheet is fed from the sheet feed cassette 14 or the manual feed tray 13 to the main conveyance path P1. A transfer process of transferring a toner image to the sheet is performed in the secondary transfer nip portion T, and the fixing process of fixing the transferred toner to the sheet is performed in the fixing device 300. Subsequently, the sheet is discharged from the sheet discharge port 12 onto the sheet discharge tray 11. On the other hand, during a double-side printing process, the transfer process and the fixing process are performed to one surface of the sheet, then the sheet is partially projected outward on the sheet discharge tray 11 from the sheet discharge port 12. Subsequently, the sheet is switchback-conveyed to be returned to near the upstream end of the main conveyance path P1 via the reverse conveyance path P2. The transfer process and the fixing process are then performed to the other surface of the sheet, then the sheet is discharged on the sheet discharge tray 11 from the sheet discharge port 12.

Figure 2:
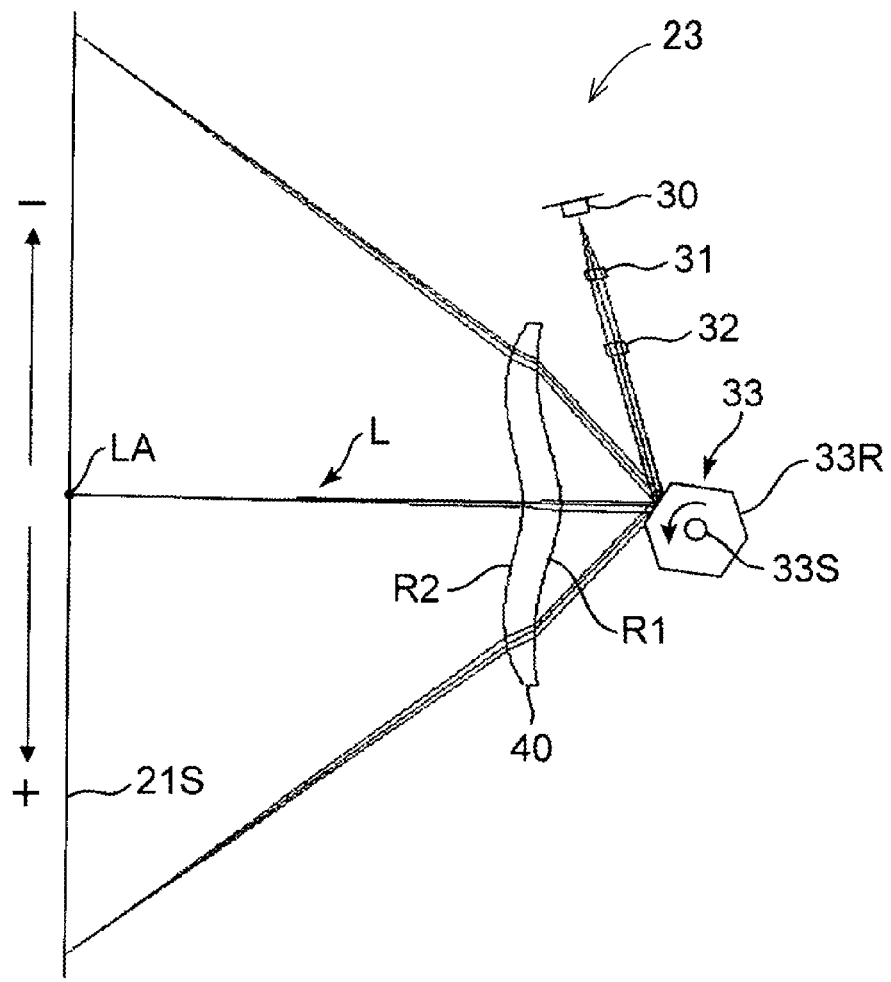
FIG. 2 is optical path diagram schematically showing the configuration of an optical scanning device in a cross section taken along a plane including the main scanning direction.
Figure 3:
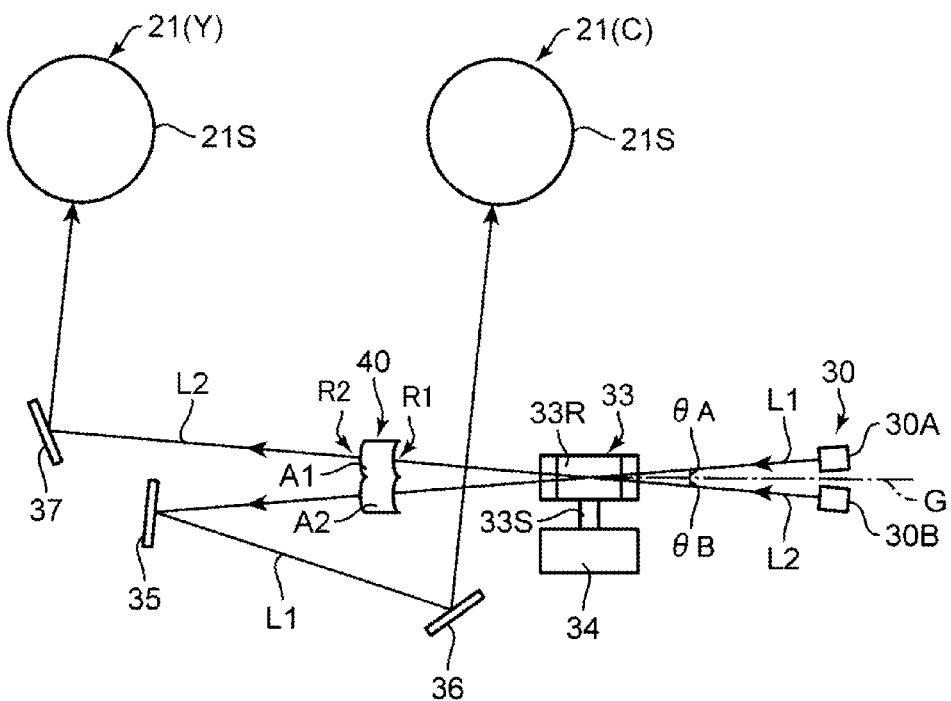
FIG. 3 is optical path diagram schematically showing the configuration of the optical scanning device in a cross section taken along a plane including the sub scanning direction.

Next, a detailed description is given of the optical scanning device 23. FIG. 2 is a cross-sectional view taken along a plane including the main scanning direction, showing the configuration of the optical scanning device 23. FIG. 3 is a cross-sectional view taken along a plane including the sub scanning direction, showing the configuration of the optical scanning device 23. The optical scanning device 23 includes a housing (not shown), laser units 30 (the light sources, a part of the light source unit) for respective colors stored in the housing, and a scanning optical system. The scanning optical system includes an incidence optical system (a part of the light source unit), a polygon mirror 33 (the deflector), and a single scanning lens 40, wherein the incident optical system includes a collimator lens 31 and a cylindrical lens 32.

In the present embodiment, a scanning optical system for yellow and cyan and a scanning optical system for magenta and black are arranged opposed to each other across the polygon mirror 33 on a main scanning plane. That is, the optical scanning device 23 of the present embodiment is based on an opposite scanning method in which two scanning optical systems arranged opposed to each other share one polygon mirror 33. FIG. 2 is a cross-sectional view taken along a plane including the main scanning direction, showing only the configuration of one of the two scanning optical systems. In addition, not only the polygon mirror 33, but also the scanning lens 40 is shared by the two-color scanning optical systems. FIG. 3 is a cross-sectional view taken along a plane including the sub scanning direction and shows the configuration of the scanning optical system for yellow and cyan.

With reference to FIG. 2, the laser unit 30 emits a laser beam L that is to be irradiated on the circumferential surface 21S (the scanned surface) of the photoconductor drum 21. The laser beam L passes through the collimator lens 31 and the cylindrical lens 32 in sequence and is then reflected by a reflection surface 33R of the polygon mirror 33. Subsequently, the laser beam L passes through the scanning lens 40 and is irradiated on the circumferential surface 21S. In the present embodiment, an oblique incidence optical system is adopted. Here, when an upstream side and a downstream side in the rotation direction (indicated by the arrow in FIG. 2) of the polygon mirror 33 are defined as a minus-side imaged-height region and a downstream side, respectively, with reference to an on-axis point LA on the circumferential surface 21S at which the laser beam on the axis is irradiated, then the incidence optical system including the collimator lens 31 and the cylindrical lens 32 for the laser beam L and the laser unit 30 is disposed in the minus-side imaged-height region.

The collimator lens 31 converts diffused light beams of the laser beam L emitted from the laser unit 30, to parallel light beams or nearly parallel light beams. The cylindrical lens 32 converts the parallel light beams to line-like light beams that are elongated in the main scanning direction and focuses the light beams on the reflection surface 33R of the polygon mirror 33.

The polygon mirror 33 is a polygon mirror having the reflection surfaces 33R that are each flat and are formed along the sides of a hexagon. A rotation shaft 33S is attached to the center of the polygon mirror 33. The rotation shaft 33S is connected to an output shaft of a polygon motor 34 (FIG. 3). As the polygon motor 34 is rotationally driven, the polygon mirror 33 is rotated around the rotation shaft 33S and reflects (deflects) the laser beam L that has been emitted from the laser unit 30 and passed through the collimator lens 31 and the cylindrical lens 32 and has focused thereon, such that the laser beam L scans the circumferential surface 21S of the photoconductor drum 21.

The scanning lens 40 is disposed between the polygon mirror 33 and the circumferential surface 21S, has a distortion aberration (fθ characteristic) that causes the angle of an incident light beam to be proportional to the imaged height, and is elongated in the main scanning direction. The scanning lens 40 collects laser beams L reflected by the polygon mirror 33 and focuses the laser beams L on the circumferential surface 21S. In the present embodiment, a single scanning lens 40 is the only lens that has a function to focus the laser beams L on the circumferential surface 21S. As a result, it is possible to reduce the number of parts of the optical scanning device 23 and make the optical scanning device 23 comp act.

With reference to FIG. 3, the laser unit 30 includes a first semiconductor laser element 30A and a second semiconductor laser element 30B, wherein the first semiconductor laser element 30A emits a laser beam (first laser beam L1) of a predetermined wavelength, and the second semiconductor laser element 30B emits a laser beam (second laser beam L2) of a predetermined wavelength. The first light beam L1 is irradiated on the circumferential surface 21S of the photoconductor drum 21 for cyan (C), and second light beam L2 is irradiated on the circumferential surface 21S of the photoconductor drum 21 for yellow (Y). The first semiconductor laser element 30A (light source) and the second semiconductor laser element 30B (light source) are assembled in the housing of the optical scanning device 23 such that the first light beam L1 and the second light beam L2 are aligned in the sub scanning direction, and the interval therebetween in the sub scanning direction expands as the light beams move toward the circumferential surfaces 21S respectively.

Here, a line perpendicular to the reflection surface 33R of the polygon mirror 33 is set as a reference line G. The reference line G is perpendicular to the sub scanning direction. The first light beam L1 and the second light beam L2 are each incident on the reflection surface 33R at an inclination with respect to the reference line G. The first light beam L1 is incident from above on the reflection surface 33R at an inclination angle θA with respect to the reference line G, and the second light beam L2 is incident from below on the reflection surface 33R at an inclination angle θB with respect to the reference line G. θA=θB, and the first light beam L1 and the second light beam L2 have a symmetrical relation with each other with respect to the reference line G. The first light beam L1 and the second light beam L2 gradually approach each other until they reach the reflection surface 33R, but gradually separate from each other after being reflected on the reflection surface 33R.

It is noted that although FIG. 3 shows an example case where the first light beam L1 and the second light beam L2 are inclined only by the inclination of each of the first semiconductor laser element 30A and the second semiconductor laser element 30B, the inclinations of the light beams may be realized in a light source unit that includes the first semiconductor laser element 30A, the second semiconductor laser element 30B, and the incidence optical system including the collimator lens 31 and the cylindrical lens 32. For example, the inclinations of the light beams may be provided by arranging the collimator lens 31 and the cylindrical lens 32, by adding an optical element for generating the inclinations into the incidence optical system, or by devising both the light source and the incidence optical system to make the light beams inclined.

That is, since the interval between the first semiconductor laser element 30A and the second semiconductor laser element 30B in the sub scanning direction expands as the light beams move toward the scanned surfaces (circumferential surfaces 21S) respectively, it is easy to cause the mirror to reflect the light beams L1 and L2 such that the light beams move independently toward the circumferential surfaces 21S respectively. A first mirror 35 and a second mirror 36 are disposed on the optical path of the first light beam L1. After being reflected on the reflection surface 33R and passing through the scanning lens 40, the first light beam L1 is reflected on the first mirror 35 and the second mirror 36, and is irradiated on the circumferential surface 21S of the photoconductor drum 21 for cyan. In addition, a third mirror 37 is disposed on the optical path of the second light beam L2. After being reflected on the reflection surface 33R and passing through the scanning lens 40, the second light beam L2 is reflected on the third mirror 37, and is irradiated on the circumferential surface 21S of the photoconductor drum 21 for yellow.

The scanning lens 40 includes a first lens portion A1 and a second lens portion A2 that are aligned in the sub scanning direction (in FIG. 3, the up-down direction) in correspondence with the second light beam L2 and the first light beam L1, respectively. That is, the first light beam L1 passes through the second lens portion A2 and is focused on the circumferential surface 21S of the photoconductor drum 21 for cyan. On the other hand, the second light beam L2 passes through the first lens portion A1 and is focused on the circumferential surface 21S of the photoconductor drum 21 for yellow.

Figure 4:
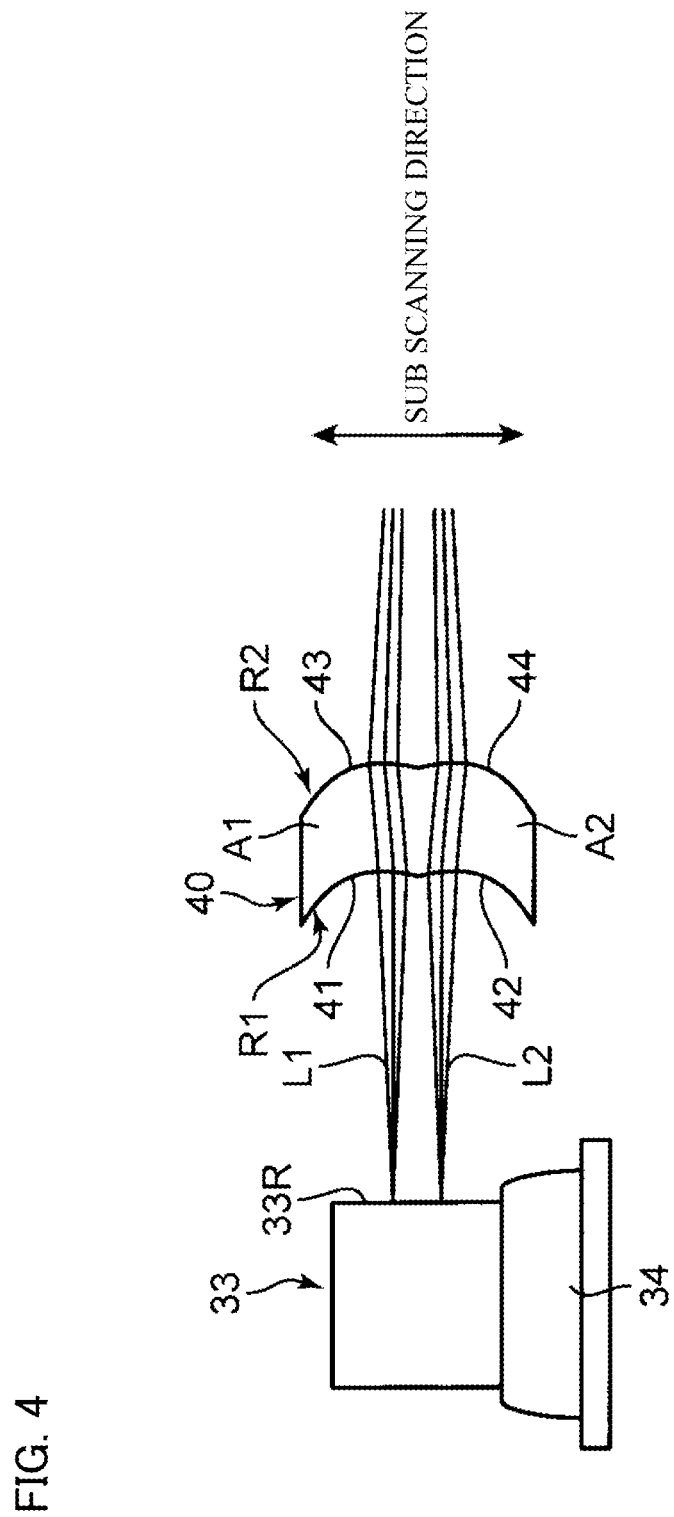
FIG. 4 is a cross-sectional view of a scanning lens taken along a plane including the sub scanning direction, showing how light beams pass through the scanning lens.
Figure 5:
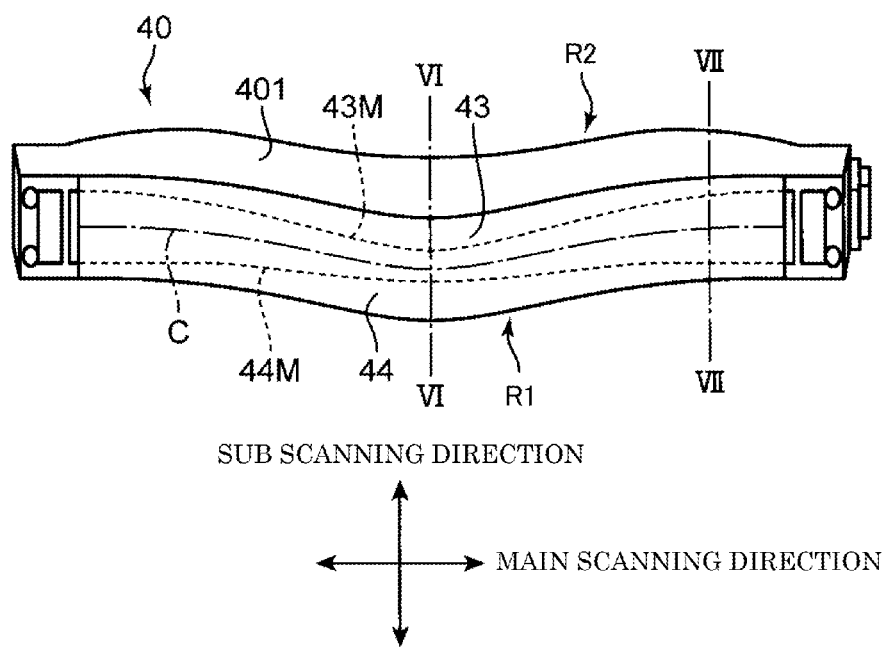
FIG. 5 is a pespective view of the scanning lens.

FIG. 4 is a cross-sectional view of the scanning lens 40 taken along a plane including the sub scanning direction, showing how the laser beams L (the first light beam L1 and the second light beam L2) pass through the scanning lens 40. FIG. 5 is a pespective view of the scanning lens 40. The scanning lens 40 includes an incident surface R1 and an emission surface R2, wherein the incident surface R1 faces the polygon mirror 33 and the laser beams L are incident on the incident surface R1, the emission surface R2 is on the opposite side to the incident surface R1 and the laser beams L go out from the emission surface R2. It is noted that, for the sake of simplification, FIG. 4 schematically shows that the first light beam L1 and the second light beam L2 are reflected on the reflection surface 33R at reflection points that are separated from each other in the sub scanning direction, and move toward the incident surface R1 as diffused light beams, and different from FIG. 3, the first light beam L1 passes through the first lens portion A1, and the second light beam L2 passes through the second lens portion A2 (the following description is based on the above-described manner in which the light beams pass through the scanning lens 40). In reality, the first light beam L1 and the second light beam L2 may be reflected on the reflection surface 33R at the same point, or the optical paths of the first light beam L1 and the second light beam L2 after the reflection on the reflection surface 33R may intersect with each other.

In the present embodiment, both the incident surface R1 and the emission surface R2 are optical refractive surfaces. The incident surface R1 is an optical refractive surface in which a first refractive surface 41 and a second refractive surface 42 are arranged in alighnment in the sub scanning direction, wherein the first light beam L1 passes through the first refractive surface 41 and the second light beam L2 passes through the second refractive surface 42. The first refractive surface 41 and the second refractive surface 42 are concave curved surfaces in a cross section taken along a plane including the sub scanning direction. The incident surface R2 is an optical refractive surface in which a third refractive surface 43 and a fourth refractive surface 44 are arranged in alighnment in the sub scanning direction, wherein the first light beam L1 passes through the third refractive surface 43 and the second light beam L2 passes through the fourth refractive surface 44. The third refractive surface 43 and the fourth refractive surface 44 are convex curved surfaces in a cross section taken along a plane including the sub scanning direction. The first refractive surface 41 and the third refractive surface 43 constitute the first lens portion A1. The second refractive surface 42 and the fourth refractive surface 44 constitute the second lens portion A2. As another embodiment, the optical refractive surface may be formed on either the incident surface R1 or the emission surface R2.

The first refractive surface 41 and the second refractive surface 42 are concave toric surfaces that extend in the main scanning direction, and the third refractive surface 43 and the fourth refractive surface 44 are convex toric surfaces that extend in the main scanning direction. The first refractive surface 41, the second refractive surface 42, the third refractive surface 43 and the fourth refractive surface 44 have a first generatrix, a second generatrix, a third generatrix and a fourth generatrix, respectively. The toric surface has a semicylindrical shape. A direction in which the semi-cylinder extends is a generatrix direction, and a direction perpendicular to the generatrix direction is a meridian direction. The meridian is a line representing a curved surface of the semi-cylinder in a cross section of the semi-cylinder. A line connecting the apexes of the meridians is the generatrix. In the present embodiment, the shapes of the refractive surfaces are set such that the interval between the first generatrix of the first refractive surface 41 and the second generatrix of the second refractive surface 42 in the sub scanning direction, and as shown in FIG. 5, the interval between the third generatrix 43M of the third refractive surface 43 and the fourth generatrix 44M of the fourth refractive surface 44 in the sub scanning direction, increase from the center portion toward the end portions of the scanning lens 40 in the main scanning direction.

Figure 6:
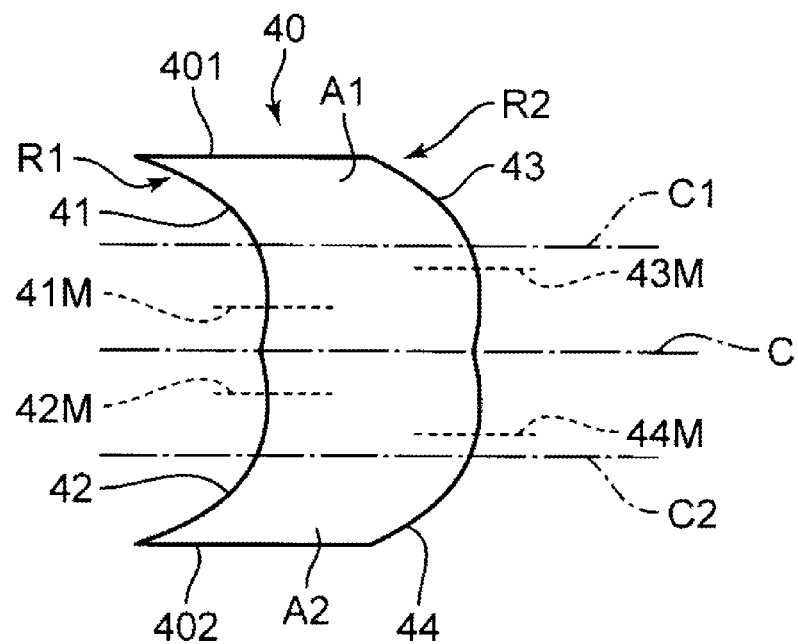
FIG. 6 is a cross section taken along a line VI-VI of FIG. 5.
Figure 7:
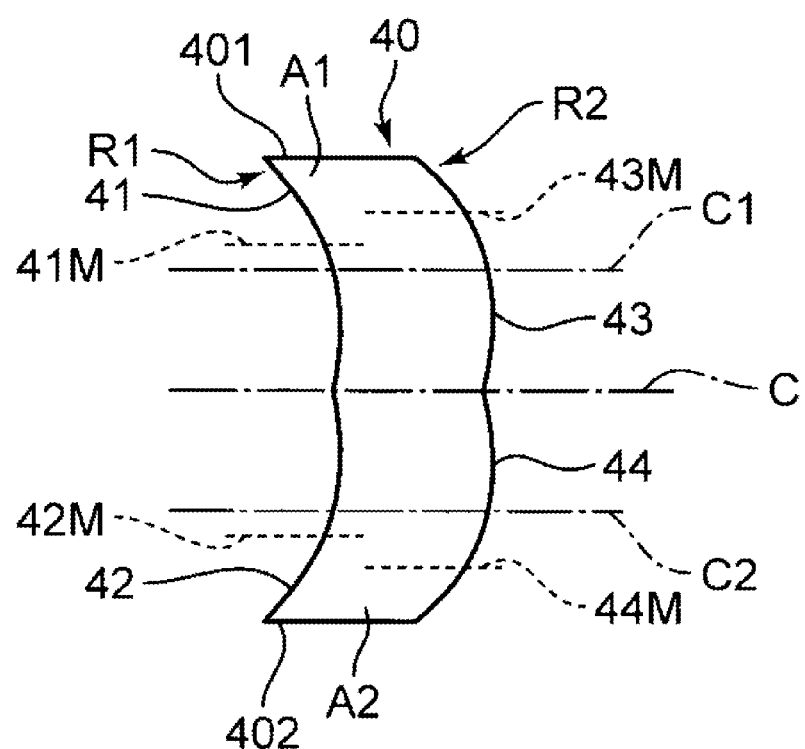
FIG. 7 is a cross section taken along a line VII-VII of FIG. 5.

The following describes the generatrix in detail based on FIG. 6 and FIG. 7. FIG. 6 is a cross section taken along the line VI-VI of FIG. 5. FIG. 7 is a cross section taken along the line VII-VII of FIG. 5. In FIG. 6 and FIG. 7, "C" represents a center portion of the scanning lens 40 in the sub scanning direction, "401" represents a lens upper-end portion, and "402" represents a lens lower-end portion. In addition, "C1" represents a first center portion which is the center portion of the first lens portion A1 (including the first refractive surface 41 and the third refractive surface 43) in the sub scanning direction, and "C2" represents a second center portion which is the center portion of the second lens portion A2 (including the second refractive surface 42 and the fourth refractive surface 44) in the sub scanning direction.

The first generatrix 41M of the first refractive surface 41 in the sub scanning direction is closer to the lens center portion C than to the first center portion C1 in the center portion (FIG. 6) in the main scanning direction, and is closer to the lens upper-end portion 401 than to the first center portion C1 in the end portion (FIG. 7) in the main scanning direction. The second generatrix 42M of the second refractive surface 42 in the sub scanning direction is closer to the lens center portion C than to the second center portion C2 in the center portion in the main scanning direction, and is closer to the lens lower-end portion 402 than to the second center portion C2 in the end portion in the main scanning direction.

Figure 8A:
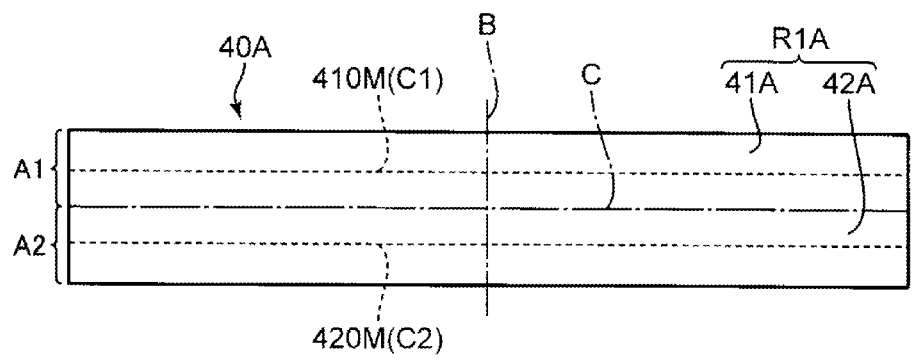
FIG. 8A is a plan view showing an incident surface of a Comparative example.
Figure 8B:
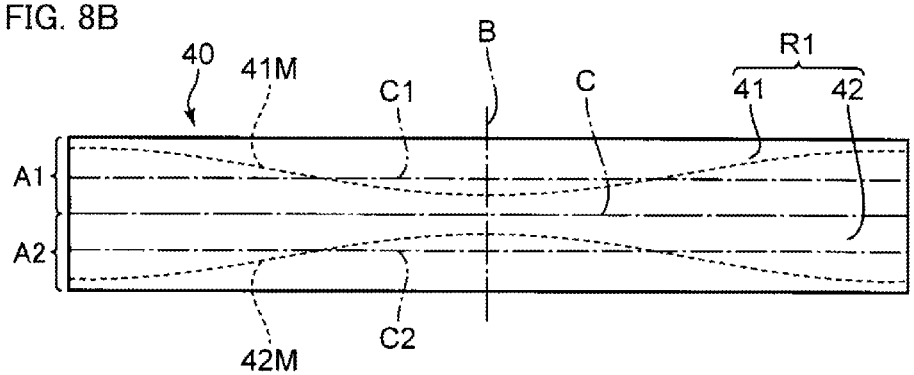
FIG. 8B is a plan view showing an incident surface according to an embodiment of the present disclosure.

FIG. 8A is a plan view showing an incident surface R1A of a scanning lens 40A that is a Comparative example. FIG. 8B is a plan view showing an incident surface R1 of the scanning lens 40 according to the present embodiment. In the incident surface R1A of the Comparative example, a first generatrix 410M of a first refractive surface 41A matches the line of the first center portion C1 of the first lens portion A1, and a second generatrix 420M of a second refractive surface 42A matches the line of the second center portion C2 of the second lens portion A2.

On the other hand, in the incident surface R1 of the present embodiment, the first generatrix 41M does not match the line of the first center portion C1, nor does the second generatrix 42M match the line of the second center portion C2. The first generatrix 41M and the second generatrix 42M are curved such that they are closest to each other in the sub scanning direction in the center portion B in the main scanning direction, and the interval between them in the sub scanning direction gradually increases from the center portion B in the main scanning direction toward both ends in the main scanning direction. With this configuration, in an oblique incidence optical system in which the first light beam L1 and the second light beam L2 are each incident at an inclination in the sub scanning direction with respect to the reference line G, the first generatrix 41M and the second generatrix 42M extend along the scanning trajectories of the first light beam L1 and the second light beam L2 in the main scanning direction, respectively. As a result, as demonstrated below with Examples, it is possible to improve the optical performance, such as the field curvature, of the optical scanning device 23.

Furthermore, the first generatrix 41M and the second generatrix 42M are respectively closer to the lens center portion C in the sub scanning direction than to the first center portion C1 and the second center portion C2 in the center portion B in the main scanning direction. In addition, the first generatrix 41M and the second generatrix 42M respectively traverse the first center portion C1 and the second center portion C2 in the middle portion in the main scanning direction, and are close to the lens end portions in the sub scanning direction in the lens end portions in the main scanning direction. That is, the first generatrix 41M and the second generatrix 42M are set by effectively using the sub scanning widths of the first lens portion A1 and the second lens portion A2. As a result, it is possible to obtain the above-mentioned excellent optical characteristics, while restricting the width of the scanning lens 40 in the sub scanning direction. It is thus possible to improve the productivity of the scanning lens 40.

The above-mentioned point also applies to the emission surface R2. The third generatrix 43M of the third refractive surface 43 in the sub scanning direction is closer to the lens center portion C than to the first center portion C1 in the center portion (FIG. 6) in the main scanning direction, and is closer to the lens upper-end portion 401 than to the first center portion C1 in the end portion (FIG. 7) in the main scanning direction. The fourth generatrix 44M of the fourth refractive surface 44 in the sub scanning direction is closer to the lens center portion C than to the second center portion C2 in the center portion in the main scanning direction, and is closer to the lens lower-end portion 402 than to the second center portion C2 in the end portion in the main scanning direction. As a result, the emission surface R2 also contributes to the obtainment of the excellent optical characteristics and the restriction of the width of the scanning lens 40 in the sub scanning direction.

Figure 9:
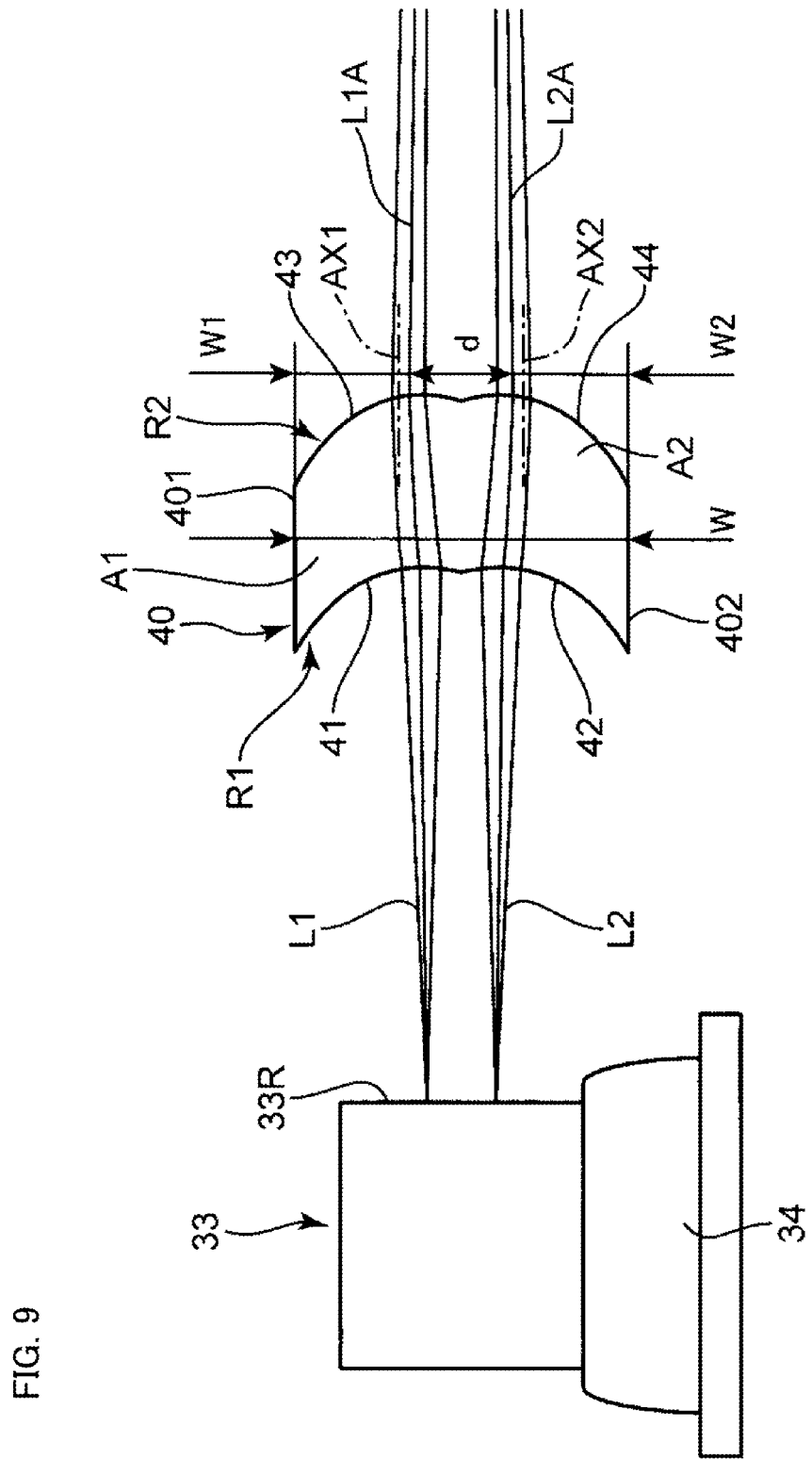
FIG. 9 is a cross-sectional view of a scanning lens taken along a plane including the sub scanning direction, showing how light beams pass through the scanning lens.

A preferred form for restricting the width of the scanning lens 40 in the sub scanning direction is described with reference to FIG. 9. The lens upper-end portion 401 (the first end surface) and the lens lower-end portion 402 (the second end surface) are planes that are parallel to the main scanning direction, wherein the lens upper-end portion 401 is an end surface on the first refractive surface 41 side in the sub scanning direction, and the lens lower-end portion 402 is an end surface on the second refractive surface 42 side in the sub scanning direction. Let W1 denote the distance between the lens upper-end portion 401 and a beam center L1A of the first light beam L1 that passes through the first refractive surface 41 and the third refractive surface 43; let W2 denote the distance between the lens lower-end portion 402 and a beam center L2A of the second light beam L2 that passes through the second refractive surface 42 and the fourth refractive surface 44; and let W denote the distance between the lens upper-end portion 401 and the lens lower-end portion 402. It is noted that in the present embodiment, since the oblique incidence optical system is adopted, the beam center L1A does not overlap an optical axis AX1 of the first lens portion A1, nor does the beam center L2A overlap an optical axis AX2 of the second lens portion A2. Under such circumstances, the scanning lens 40 preferably satisfies the following equation (1).

$$(W1+W2)\times 2 > W \tag{1}$$

Alternatively, in addition to W1 and W2 defined above, let d denote the distance between the beam center L1A of the first light beam L1 and the beam center L2A of the second light beam L2, then the scanning lens 40 preferably satisfies the following equation (2).

$$W1+W2 > d \tag{2}$$

When the equation (1) or the equation (2) provided above is satisfied, the first lens portion A1 and the second lens portion A2 do not separate from each other in the sub scanning direction. As a result, it is possible to restrict the width of the scanning lens 40 in the sub scanning direction.

Example 1

Table 1 illustrates a configuration of a focusing optical system that satisfies the requirements for the optical scanning device 23 of the present embodiment. The unit of the length and distance is mm. In the focusing optical system of Example 1, the collimator lens 31, the cylindrical lens 32, the polygon mirror 33 and the scanning lens 40 are arranged in order from the laser unit 30 side, as shown in FIG. 3.

TABLE 1

| Polygon mirror | |
|---|---|
| Number of mirror surfaces | 5 |
| Surface length | 17.63 |
| Distance | |
| Polygon mirror - scanning lens | 23.71 |
| Scanning lens center thickness | 9 |
| Scanning lens - image surface | 119.09 |

The surface shapes of the incident surface R1 and the emission surface R2 of the scanning lens 40 are defined by the equations shown below that represent the sagging quantity, by using a local orthogonal coordinate system (x, y, z) where x represents the sub scanning direction, y represents the main scanning direction, z represents the optical axis direction, the surface apex serves as the origin, and the direction toward the photoconductor drum 21 serves as the positive direction of the z axis. It is noted that Zm (the main scanning direction) and Zs (the sub scanning direction) represent displacement in the z axis direction (with reference to the surface apex) at the height y.

[Math. 1]

$$Sagz = Zm + Zs$$

$$Zm = \frac{Cm \times Y^2}{(1 + \sqrt{(1 + (1 + Ky) \times Cm^2 \times Y^2)})} + \sum_{N=1} An \times Y^n$$

$$Zs = \frac{Cs \times (X + Kx)^2}{(1 + \sqrt{(1 + (1 + K) \times Cs^2 \times (X + Lx)^2)})} + \sum_{N=1} Sn \times (X + Lx)^n$$

$$Cs = \sum_{N=0} Bn \times Y^2$$

$$Lx = \sum_{N=0} Ln \times Y^n$$

In the equations above, Y denotes a position in the main scanning direction, X denotes a position in the sub scanning direction, An and Bn (n is an integer) denote high-order coefficients of surface shape, Cm denotes the curvature in the main scanning direction, Cs denotes the curvature in the sub scanning direction, Sn denotes the sub scanning aspherical coefficient, Kx denotes the sub scanning conic coefficient, and Lx denotes the curve of the generatrix.

Table 2 shows the surface shapes of the incident surface R1 and the emission surface R2 of the scanning lens 40. It is noted that the incident surface R1 and the emission surface R2 represent the surface shapes of the first refractive surface 41 and the third refractive surface 43, respectively. The second refractive surface 42 and the first refractive surface 41 are symmetrical with respect to the lens center portion C, and the fourth refractive surface 44 and the third refractive surface 43 are symmetrical with respect to the lens center portion C.

TABLE 2

| | R1 | R2 |
|---|---|---|
| Cm | 4.531E-02 | 4.576E-02 |
| A1 | 0.000E+00 | 2.859E-03 |
| A2 | -2.527E-03 | -4.305E-03 |
| A3 | 0.000E+00 | -2.432E-06 |
| A4 | -2.041E-06 | -1.751E-06 |

TABLE 2-continued

| | R1 | R2 |
|---|---|---|
| A5 | 0.000E+00 | 5.017E-10 |
| A6 | 4.655E-10 | 1.493E-10 |
| A7 | 0.000E+00 | 0.000E+00 |
| A8 | -4.406E-14 | -5.483E-14 |
| A9 | 0.000E+00 | 0.000E+00 |
| A10 | 0.000E+00 | 0.000E+00 |
| Ky | -6.395E+00 | -6.158E+00 |
| Cs0 | -8.716E-02 | -1.313E-01 |
| S1 | -5.240E-02 | -5.240E-02 |
| Kx | 0.000E+00 | 0.000E+00 |
| B1 | -1.303E-03 | -5.689E-04 |
| B2 | 4.742E-04 | 3.148E-04 |
| B3 | 1.438E-05 | 3.880E-06 |
| B4 | -1.257E-06 | -7.184E-07 |
| B5 | -8.206E-08 | -1.411E-08 |
| B6 | -5.037E-11 | 2.085E-10 |
| B7 | 2.558E-10 | 1.938E-11 |
| B8 | 1.237E-11 | 4.109E-12 |
| B9 | -4.771E-13 | 6.890E-15 |
| B10 | -3.885E-14 | -1.168E-14 |
| B11 | 5.638E-16 | -5.395E-17 |
| B12 | 5.941E-17 | 1.573E-17 |
| B13 | -4.333E-19 | 6.988E-20 |
| B14 | -5.198E-20 | -1.216E-20 |
| B15 | 2.145E-22 | -4.332E-23 |
| B16 | 2.639E-23 | 5.511E-24 |
| B17 | -6.346E-26 | 1.339E-26 |
| B18 | -7.210E-27 | -1.362E-27 |
| B19 | 8.626E-30 | -1.649E-30 |
| B20 | 8.145E-31 | 1.416E-31 |
| L0 | -1.227E+00 | -1.737E+00 |
| L1 | 2.449E-03 | 2.088E-03 |
| L2 | -8.316E-04 | -1.202E-03 |
| L3 | 1.136E-07 | -5.370E-07 |
| L4 | 1.293E-07 | 3.989E-07 |

Figure 10:
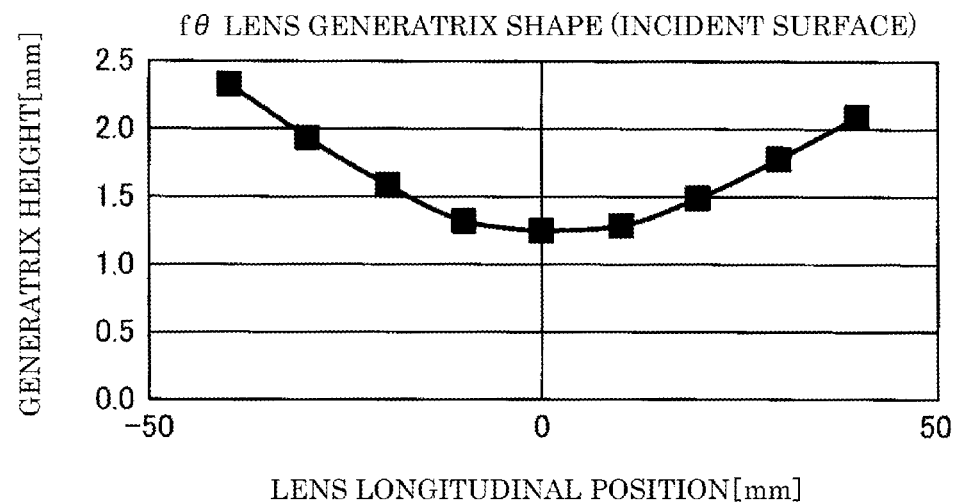
FIG. 10 is a graph showing the change of the generatrix height position in the main scanning direction in the incident surface of the scanning lens of Example 1.
Figure 11:
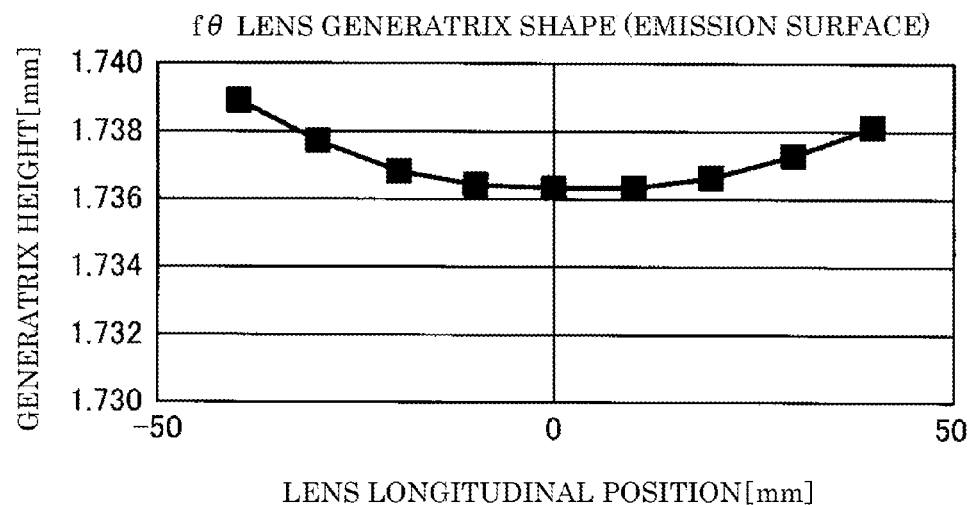
FIG. 11 is a graph showing the change of the generatrix height position in the main scanning direction in the emission surface of the scanning lens of Example 1.

FIG. 10 is a graph showing the change of the generatrix height position in the main scanning direction in the incident surface R1 of the scanning lens 40 of Example 1. FIG. 11 is a graph showing the change of the generatrix height position in the main scanning direction in the emission surface R2. As shown in these graphs, the height of the generatrix (the first generatrix 41M, the third generatrix 43M) in the plus direction is low at the center portion in the main scanning direction (lens longitudinal direction), and becomes higher toward the end portions. Although not shown, in contrast to these graphs, the graphs showing the height of the generatrices of the second refractive surface 42 and the fourth refractive surface 44 are in the minus direction. As a result, the interval between the first generatrix 41M and the second generatrix 42M in the sub scanning direction increases from the center portion toward the end portions in the main scanning direction.

Figure 12:
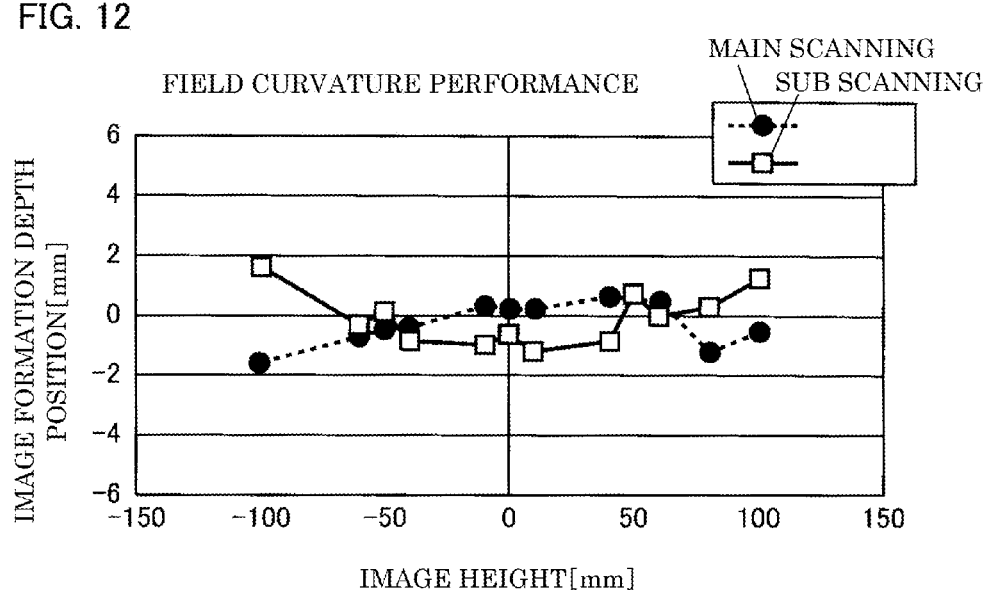
FIG. 12 is a graph showing the field curvature performance of the optical scanning device using the scanning lens of Example 1.

FIG. 12 is a graph showing the field curvature performance of the optical scanning device 23 using the scanning lens 40 of Example 1. The variation of the image formation depth position, which shows the field curvature performance in the main scanning direction and the sub scanning direction, is within the range of +2 mm to -2 mm all over the image height. This shows an excellent optical characteristic.

Example 2

Figure 13:
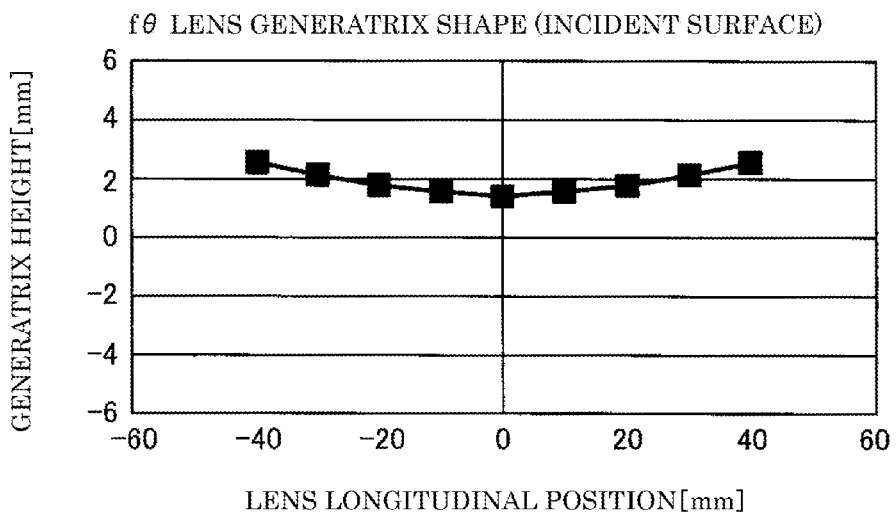
FIG. 13 is a graph showing the change of the generatrix height position in the main scanning direction in the incident surface of the scanning lens of Example 2.
Figure 14:
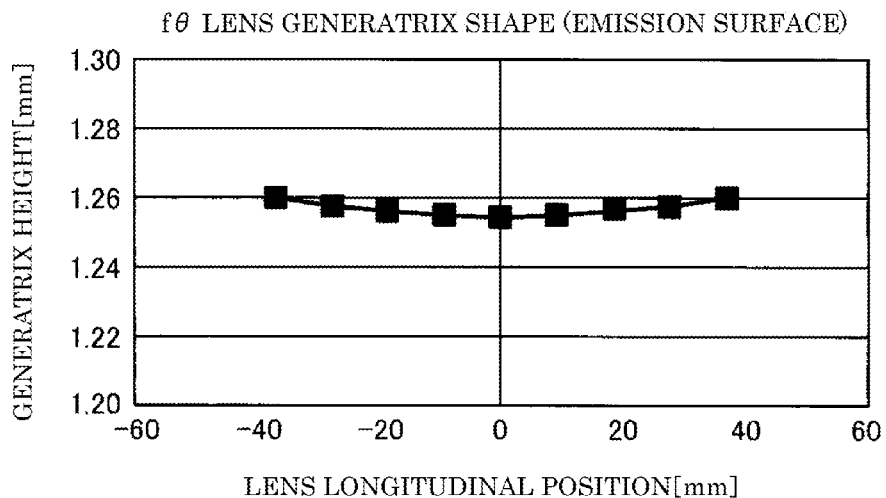
FIG. 14 is a graph showing the change of the generatrix height position in the main scanning direction in the emission surface of the scanning lens of Example 2.

An optical scanning device according to Example 2 was generated by using the same focusing optical system as Example 1, except that the scanning lens 40 was different from that of Example 1. Table 3 shows the surface shapes of the incident surface R1 and the emission surface R2 of the scanning lens 40 used in Example 2. Similarly, the incident surface R1 represents the surface shape of the first refractive surface 41, and the emission surface R2 represents the surface shape of the third refractive surface 43. The second refractive surface 42 and the first refractive surface 41 are symmetrical with respect to the lens center portion C, and the fourth refractive surface 44 and the third refractive surface 43 are symmetrical with respect to the lens center portion C. In addition, FIG. 13 is a graph showing the change of the generatrix height position in the main scanning direction in the incident surface R1 of the scanning lens 40 of Example 2. FIG. 14 is a graph showing the change of the generatrix height position in the main scanning direction in the emission surface R2.

TABLE 3

|  | R1 | R2 |
|---|---|---|
| Cm | 4.531E−02 | 4.576E−02 |
| A1 | 0.000E+00 | 2.859E−03 |
| A2 | −2.527E−03 | −4.305E−03 |
| A3 | 0.000E+00 | −2.432E−06 |
| A4 | −2.041E−06 | −1.751E−06 |
| A5 | 0.000E+00 | 5.017E−10 |
| A6 | 4.655E−10 | 1.493E−10 |
| A7 | 0.000E+00 | 0.000E+00 |
| A8 | −4.406E−14 | −5.483E−14 |
| A9 | 0.000E+00 | 0.000E+00 |
| A10 | 0.000E+00 | 0.000E+00 |
| Ky | −6.395E+00 | −6.159E+00 |
| Cs0 | −1.383E−03 | −6.939E−04 |
| S1 | 4.388E−04 | 3.316E−04 |
| Kx | −1.456E−05 | −4.131E−06 |
| B1 | −1.271E−06 | −7.517E−07 |
| B2 | −8.197E−08 | −1.436E−08 |
| B3 | −5.388E−11 | 2.088E−10 |
| B4 | 2.555E−10 | 1.950E−11 |
| B5 | 1.239E−11 | 4.121E−12 |
| B6 | −4.772E−13 | 6.925E−15 |
| B7 | −3.884E−14 | −1.168E−14 |
| B8 | 5.638E−16 | −5.395E−17 |
| B9 | 5.941E−17 | 1.572E−17 |
| B10 | −4.331E−19 | 6.987E−20 |
| B11 | −5.199E−20 | −1.216E−20 |
| B12 | 2.146E−22 | −4.333E−23 |
| B13 | 2.639E−23 | 5.512E−24 |
| B14 | −6.343E−26 | 1.338E−26 |
| B15 | −7.209E−27 | −1.361E−27 |
| B16 | 8.516E−30 | −1.639E−30 |
| B17 | 8.188E−31 | 1.410E−31 |
| B18 | −4.235E−02 | −1.081E−01 |
| B19 | 6.090E−02 | 6.192E−02 |
| B20 | 0.000E+00 | 0.000E+00 |
| L0 | 1.345E+00 | 1.251E+00 |
| L1 | 4.327E−05 | 1.317E−03 |
| L2 | 8.879E−04 | 1.023E−03 |
| L3 | −1.136E−07 | −1.200E−06 |
| L4 | −1.293E−07 | 0.000E+00 |

Figure 15:
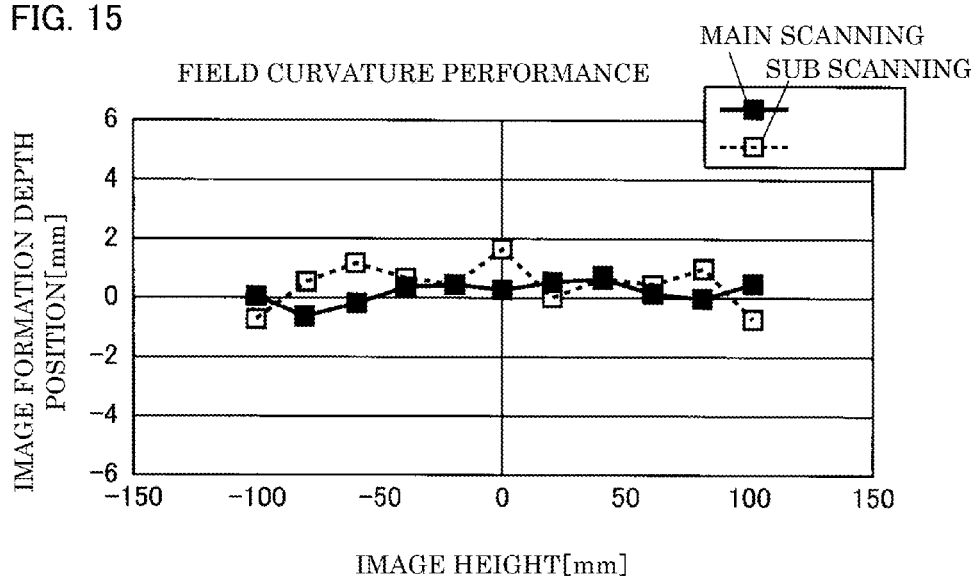
FIG. 15 is a graph showing the field curvature performance of the optical scanning device using the scanning lens of Example 2.

FIG. 15 is a graph showing the field curvature performance of the optical scanning device 23 using the scanning lens 40 according to Example 2. The variation of the image formation depth position, which shows the field curvature performance in the main scanning direction and the sub scanning direction, is within the range of +2 mm to −2 mm all over the image height. This shows an excellent optical characteristic.

Example 3

Figure 16:
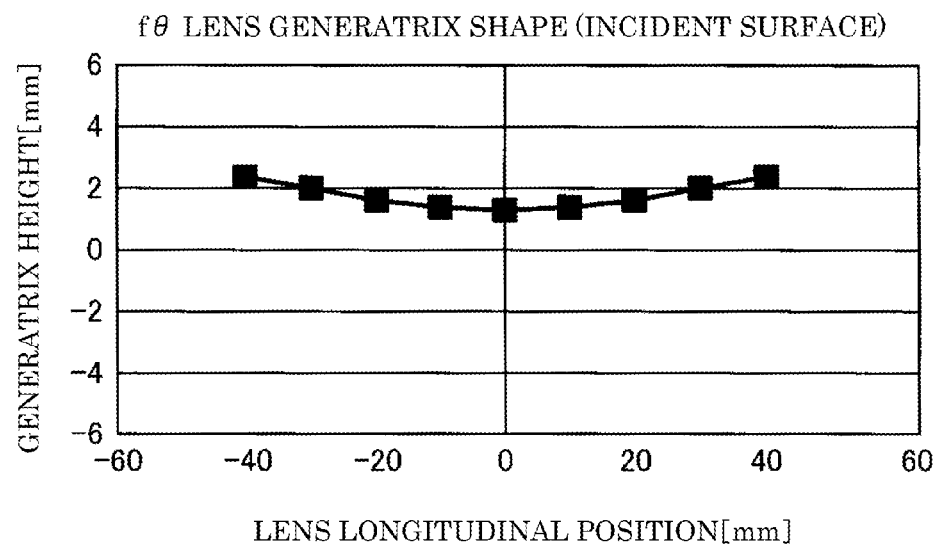
FIG. 16 is a graph showing the change of the generatrix height position in the main scanning direction in the incident surface of the scanning lens of Example 3.
Figure 17:
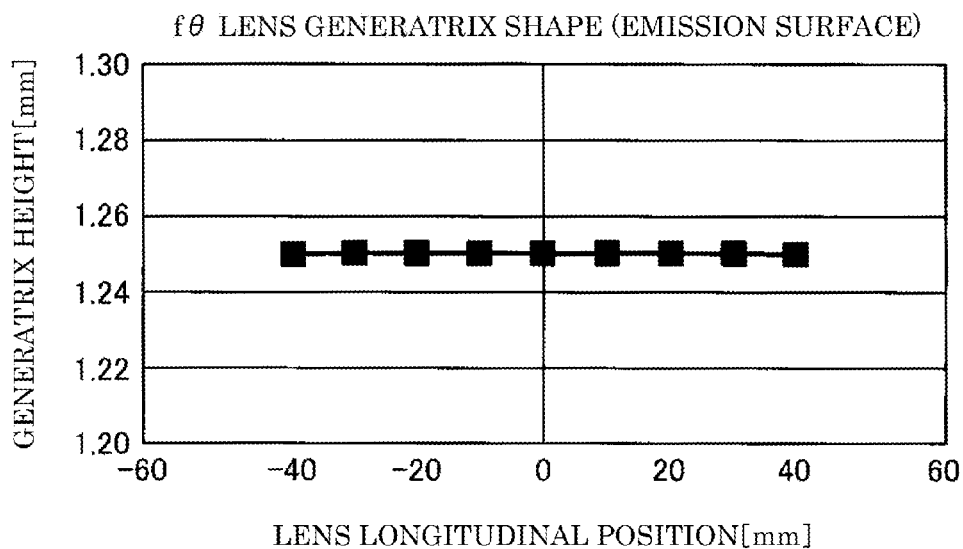
FIG. 17 is a graph showing the change of the generatrix height position in the main scanning direction in the emission surface of the scanning lens of Example 3.

An optical scanning device according to Example 3 was generated by using the same focusing optical system as Example 1, except that the scanning lens 40 was different from that of Example 1. Table 4 shows the surface shapes of the incident surface R1 and the emission surface R2 of the scanning lens 40 used in Example 3. Similarly, the incident surface R1 represents the surface shape of the first refractive surface 41, and the emission surface R2 represents the surface shape of the third refractive surface 43. The second refractive surface 42 and the first refractive surface 41 are symmetrical with respect to the lens center portion C, and the fourth refractive surface 44 and the third refractive surface 43 are symmetrical with respect to the lens center portion C. In addition, FIG. 16 is a graph showing the change of the generatrix height position in the main scanning direction in the incident surface R1 of the scanning lens 40 of Example 3. FIG. 17 is a graph showing the change of the generatrix height position in the main scanning direction in the emission surface R2. It is noted that, different from Examples 1 and 2, in Example 3, the generatrix in the emission surface R2 does not have a curve, and only the incident surface R1 has the generatrix curve.

TABLE 4

|  | R1 | R2 |
|---|---|---|
| Cm | 4.531E−02 | 4.576E−02 |
| A1 | 0.000E+00 | 2.859E−03 |
| A2 | −2.527E−03 | −4.305E−03 |
| A3 | 0.000E+00 | −2.432E−06 |
| A4 | −2.041E−06 | −1.751E−06 |
| A5 | 0.000E+00 | 5.017E−10 |
| A6 | 4.655E−10 | 1.493E−10 |
| A7 | 0.000E+00 | 0.000E+00 |
| A8 | −4.406E−14 | −5.483E−14 |
| A9 | 0.000E+00 | 0.000E+00 |
| A10 | 0.000E+00 | 0.000E+00 |
| Ky | −6.395E+00 | −6.158E+00 |
| Cs0 | −1.303E−03 | −5.689E−04 |
| S1 | 4.742E−04 | 3.148E−04 |
| Kx | −1.438E−05 | −3.880E−06 |
| B1 | −1.257E−06 | −7.184E−07 |
| B2 | −8.206E−08 | −1.411E−08 |
| B3 | −5.037E−11 | 2.085E−10 |
| B4 | 2.558E−10 | 1.938E−11 |
| B5 | 1.237E−11 | 4.109E−12 |
| B6 | −4.771E−13 | 6.890E−15 |
| B7 | −3.885E−14 | −1.168E−14 |
| B8 | 5.638E−16 | −5.395E−17 |
| B9 | 5.941E−17 | 1.573E−17 |
| B10 | −4.333E−19 | 6.988E−20 |
| B11 | −5.198E−20 | −1.216E−20 |
| B12 | 2.145E−22 | −4.332E−23 |
| B13 | 2.639E−23 | 5.511E−24 |
| B14 | −6.346E−26 | 1.339E−26 |
| B15 | −7.210E−27 | −1.362E−27 |
| B16 | 8.626E−30 | −1.649E−30 |
| B17 | 8.145E−31 | 1.416E−31 |
| B18 | −8.778E−02 | −1.313E−01 |
| B19 | −5.240E−02 | −5.240E−02 |
| B20 | 0.000E+00 | 0.000E+00 |
| L0 | 1.227E+00 | 1.251E+00 |
| L1 | −2.449E−03 | 0.000E+00 |
| L2 | 8.316E−04 | 0.000E+00 |
| L3 | −1.136E−07 | 0.000E+00 |
| L4 | −1.293E−07 | 0.000E+00 |

Figure 18:
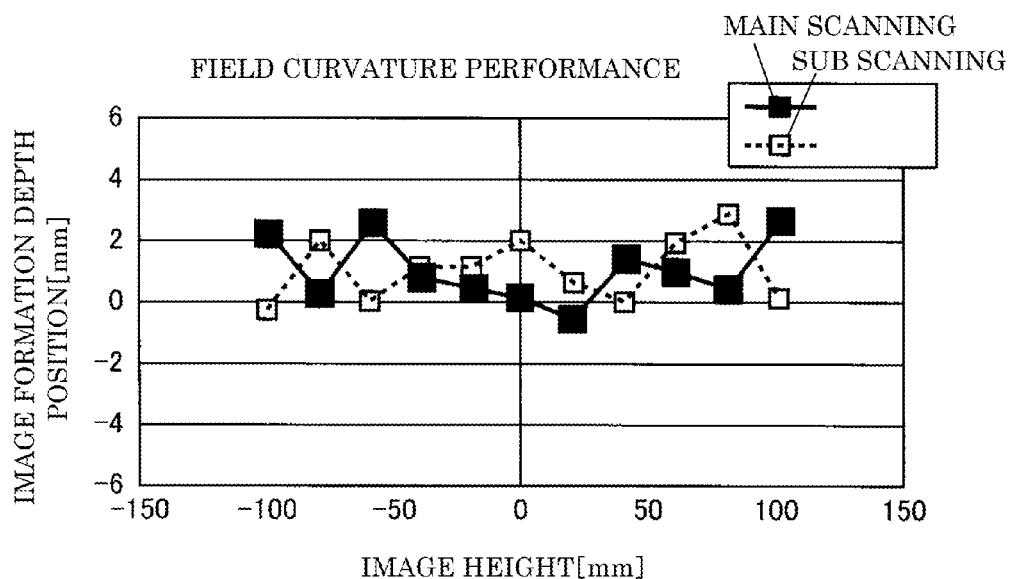
FIG. 18 is a graph showing the field curvature performance of the optical scanning device using the scanning lens of Example 3.

FIG. 18 is a graph showing the field curvature performance of the optical scanning device 23 using the scanning lens 40 according to Example 3. The variation of the image formation depth position, which shows the field curvature performance in the main scanning direction and the sub scanning direction, is within the range of approximately +2.5 mm to −2.5 mm all over the image height. Although slightly inferior to those of Examples 1 and 2, this shows an excellent optical characteristic.

Comparative Example

An optical scanning device according to the Comparative example was generated by using the same focusing optical system as Example 1, except that the scanning lens 40 was different from that of Example 1. Table 5 shows the surface shapes of the incident surface R1 and the emission surface R2 of the scanning lens 40 used in the Comparative example. In the Comparative example, as shown in FIG. 8A, in both the incident surface R1 and the emission surface R2, the generatrix does not have a curve.

TABLE 5

|     | R1         | R2         |
|-----|------------|------------|
| Cm  | 4.531E−02  | 4.576E−02  |
| A1  | 0.000E+00  | 2.859E−03  |
| A2  | −2.527E−03 | −4.305E−03 |
| A3  | 0.000E+00  | −2.432E−06 |
| A4  | −2.041E−06 | −1.751E−06 |
| A5  | 0.000E+00  | 5.017E−10  |
| A6  | 4.655E−10  | 1.493E−10  |
| A7  | 0.000E+00  | 0.000E+00  |
| A8  | −4.406E−14 | −5.483E−14 |
| A9  | 0.000E+00  | 0.000E+00  |
| A10 | 0.000E+00  | 0.000E+00  |
| Ky  | −6.395E+00 | −6.316E+00 |
| Cs0 | −1.624E−03 | −7.731E−04 |
| S1  | 4.458E−04  | 3.307E−04  |
| Kx  | −1.495E−05 | −4.004E−06 |
| B1  | −1.302E−06 | −7.639E−07 |
| B2  | −8.220E−08 | −1.413E−08 |
| B3  | −4.631E−11 | 2.163E−10  |
| B4  | 2.556E−10  | 1.964E−11  |
| B5  | 1.239E−11  | 4.112E−12  |
| B6  | −4.768E−13 | 6.913E−15  |
| B7  | −3.885E−14 | −1.169E−14 |
| B8  | 5.638E−16  | −5.404E−17 |
| B9  | 5.940E−17  | 1.573E−17  |
| B10 | −4.335E−19 | 6.982E−20  |
| B11 | −5.198E−20 | −1.216E−20 |
| B12 | 2.144E−22  | −4.333E−23 |
| B13 | 2.640E−23  | 5.514E−24  |
| B14 | −6.338E−26 | 1.341E−26  |
| B15 | −7.203E−27 | −1.362E−27 |
| B16 | 8.679E−30  | −1.634E−30 |
| B17 | 8.078E−31  | 1.403E−31  |
| B18 | −5.115E−02 | −1.148E−01 |
| B19 | −1.125E−01 | −9.040E−02 |
| B20 | 0.000E+00  | 0.000E+00  |
| L0  | 9.863E−01  | 1.251E+00  |
| L1  | 0.000E+00  | 0.000E+00  |
| L2  | 0.000E+00  | 0.000E+00  |
| L3  | 0.000E+00  | 0.000E+00  |
| L4  | 0.000E+00  | 0.000E+00  |

Figure 19:
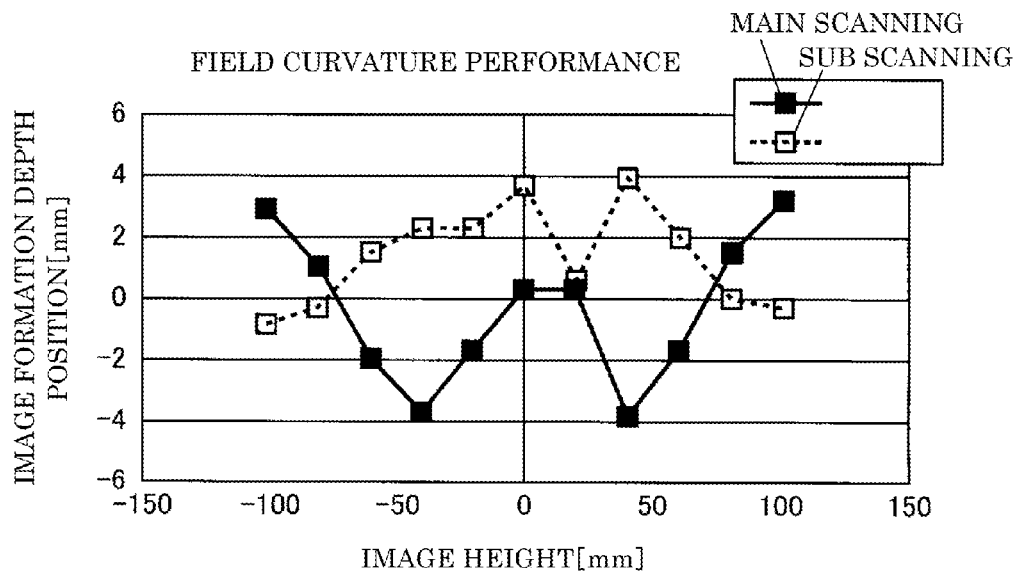
FIG. 19 is a graph showing the field curvature performance of the optical scanning device using the scanning lens of the Comparative example.

FIG. 19 is a graph showing the field curvature performance of the optical scanning device using the scanning lens 40 according to the Comparative example. The variation of the image formation depth position, which shows the field curvature performance in the main scanning direction and the sub scanning direction, exceeds the range of approximately +3.0 mm to −3.0 mm in both the main scanning direction and the sub scanning direction. It cannot be said that this shows an excellent optical characteristic.

Conventionally, in an optical scanning device using a scanning lens that includes a plurality of independent optical surfaces, it has been difficult to improve optical characteristics such as the field curvature performance to be excellent. In particular, in an optical system in which the scanning lens is the only lens that has a function to focus the laser beam on the circumferential surface of the drum, it has been difficult to obtain an excellent optical performance. On the other hand, according to the optical scanning device 23 and the image forming apparatus 1 of the above-described embodiment using the scanning lens 40 having a plurality of independent optical surfaces (the first refractive surface 41 and the second refractive surface 42, the third refractive surface 43 and the fourth refractive surface 44) in the sub scanning direction, excellent optical performances can be obtained. As a result, it is possible to provide the optical scanning device 23 and the image forming apparatus 1 that can form high-quality electrostatic latent image and toner image.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An optical scanning device comprising:
a light source unit including a light source for emitting a first light beam and a second light beam that are to be irradiated on a scanned surface, and an incidence optical system for the first light beam and the second light beam, the light source unit configured to emit the first light beam and the second light beam with angles respectively with respect to a reference line perpendicular to a sub scanning direction such that the first light beam and the second light beam are aligned in the sub scanning direction and an interval between the first light beam and the second light beam in the sub scanning direction expands toward the scanned surface;
a deflector configured to reflect the first light beam and the second light beam emitted from the light source unit such that the first light beam and the second light beam scan the scanned surface in a main scanning direction; and
a scanning lens disposed between the deflector and the scanned surface, including an incident surface and an emission surface, and configured to focus the first light beam and the second light beam on the scanned surface, wherein
at least one of the incident surface and the emission surface is an optical refractive surface in which a first refractive surface and a second refractive surface are arranged in alighnment in the sub scanning direction, wherein the first light beam passes through the first refractive surface and the second light beam passes through the second refractive surface, and
an interval between a first generatrix of the first refractive surface and a second generatrix of the second refractive surface in the sub scanning direction increases from a center portion toward end portions of the scanning lens in the main scanning direction.

2. The optical scanning device according to claim 1, wherein
each of the incident surface and the emission surface is the optical refractive surface.

3. The optical scanning device according to claim 1, wherein
among a plurality of lenses provided in the optical scanning device, only the scanning lens has a function to focus the first light beam and the second light beam on the scanned surface.

4. The optical scanning device according to claim 1, wherein
when a lens center portion represents a center portion of the scanning lens in the sub scanning direction, lens end portions represent end portions of the scanning lens in the sub scanning direction, a first center portion represents a center portion of the first refractive surface in the sub scanning direction, and a second center portion represents a center portion of the second refractive surface in the sub scanning direction, a position of the first generatrix in the sub scanning direction is
- closer to the lens center portion than to the first center portion in a center portion in the main scanning direction, and is closer to the lens end portions than to the first center portion in end portions in the main scanning direction, and a position of the second generatrix in the sub scanning direction is
- closer to the lens center portion than to the second center portion in the center portion in the main scanning direction, and is closer to the lens end portions than to the second center portion in the end portions in the main scanning direction.

5. The optical scanning device according to claim 1, wherein the scanning lens includes a first end surface and a second end surface that are planes parallel to the main scanning direction, the first end surface being an end surface on a first refractive surface side in the sub scanning direction, the second end surface being an end surface on a second refractive surface side in the sub scanning direction, let W1 denote a distance between the first end surface and a beam center of the first light beam that passes through the first refractive surface, let W2 denote a distance between the second end surface and a beam center of the second light beam that passes through the second refractive surface, and let W denote a distance between the first end surface and the second end surface, and the following equation (1) is satisfied:

$$(W1+W2)\times 2 > W \qquad (1).$$

6. The optical scanning device according to claim 1, wherein the scanning lens includes a first end surface and a second end surface that are planes parallel to the main scanning direction, the first end surface being an end surface on a first refractive surface side in the sub scanning direction, the second end surface being an end surface on a second refractive surface side in the sub scanning direction, let W1 denote a distance between the first end surface and a beam center of the first light beam that passes through the first refractive surface, let W2 denote a distance between the second end surface and a beam center of the second light beam that passes through the second refractive surface, and let d denote a distance between the beam center of the first light beam and the beam center of the second end surface, and the following equation (2) is satisfied:

$$W1+W2 > d \qquad (2).$$

7. An image forming apparatus comprising:

an image carrying member configured to carry an electrostatic latent image; and the optical scanning device according to claim 1 configured to emit a light beam, the scanned surface being a circumferential surface of the image carrying member.

* * * * *